United States Patent
Prior

(12) 
(10) Patent No.: US 8,297,238 B2
(45) Date of Patent: Oct. 30, 2012

(54) VARIABLE COOLING CIRCUIT FOR THERMOELECTRIC GENERATOR AND ENGINE AND METHOD OF CONTROL

(75) Inventor: Gregory P. Prior, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 12/753,142

(22) Filed: Apr. 2, 2010

(65) Prior Publication Data
US 2011/0239964 A1    Oct. 6, 2011

(51) Int. Cl.
*F01P 1/06* (2006.01)
(52) U.S. Cl. ....... 123/41.31; 123/142.5 E; 123/142.5 R; 60/320; 136/218
(58) Field of Classification Search ............... 123/41.31, 123/41.51, 142.5 E, 142.5 R; 60/320; 136/218
See application file for complete search history.

(56) References Cited

U.S. PATENT DOCUMENTS

| | | | |
|---|---|---|---|
| 5,625,245 | A | 4/1997 | Bass |
| 5,753,383 | A | 5/1998 | Cargnelli et al. |
| 7,051,522 | B2 | 5/2006 | Yang et al. |
| 7,100,369 | B2 * | 9/2006 | Yamaguchi et al. ............ 60/324 |
| 2002/0126236 | A1 * | 9/2002 | Hiratsuka et al. ............... 349/58 |
| 2003/0223919 | A1 * | 12/2003 | Kwak et al. .................... 422/174 |
| 2005/0194034 | A1 * | 9/2005 | Yamaguchi et al. .......... 136/205 |
| 2006/0000651 | A1 * | 1/2006 | Stabler ......................... 180/65.3 |

* cited by examiner

*Primary Examiner* — Noah Kamen
*Assistant Examiner* — Hung Q Nguyen
(74) *Attorney, Agent, or Firm* — Quinn Law Group, PLLC

(57) ABSTRACT

An apparatus is provided that includes an engine, an exhaust system, and a thermoelectric generator (TEG) operatively connected to the exhaust system and configured to allow exhaust gas flow therethrough. A first radiator is operatively connected to the engine. An openable and closable engine valve is configured to open to permit coolant to circulate through the engine and the first radiator when coolant temperature is greater than a predetermined minimum coolant temperature. A first and a second valve are controllable to route cooling fluid from the TEG to the engine through coolant passages under a first set of operating conditions to establish a first cooling circuit, and from the TEG to a second radiator through at least some other coolant passages under a second set of operating conditions to establish a second cooling circuit. A method of controlling a cooling circuit is also provided.

11 Claims, 2 Drawing Sheets

VARIABLE COOLING CIRCUIT FOR THERMOELECTRIC GENERATOR AND ENGINE AND METHOD OF CONTROL

STATEMENT REGARDING FEDERALLY SPONSORED RESEARCH OR DEVELOPMENT

This invention was made with government support under Department of Energy Agreement number DE-FC26-04NT42278. The government may have certain rights in the invention.

TECHNICAL FIELD

The invention relates to a cooling circuit for an engine and for a thermoelectric generator in an exhaust system of the engine, and to a method of control thereof.

BACKGROUND OF THE INVENTION

Recovery of vehicle exhaust heat otherwise expelled from a vehicle can improve the efficiency of various vehicle systems and improve fuel economy. For example, vehicle exhaust heat has been used to warm engine coolant, especially after a cold start of the engine. Furthermore, a thermoelectric generator (TEG) can be integrated into a vehicle exhaust system to produce electrical energy from a temperature differential created by the exhaust heat and coolant. Cooling of the TEG is sometimes accomplished by directing coolant from the TEG through the engine and engine radiator. While this minimizes the number of components required in the cooling circuit, the engine heat added to the coolant reduces the temperature differential in the TEG, thus reducing the electric output of the TEG. Other known designs utilize a separate radiator, coolant pump and coolant lines for the TEG. Besides the added cost of these additional components, the heat from the TEG added to the coolant is not utilized for improving engine warm-up in such an arrangement, and system maintenance is more complex, as each of the two separate cooling circuits must be filled with coolant separately.

SUMMARY OF THE INVENTION

An apparatus is provided that uses heat from a thermoelectric generator (TEG) to warm the engine under some operating conditions, and also utilizes a separate radiator for the TEG coolant to improve TEG efficiency under operating conditions in which the engine is already warmed and is operating under a relatively high load. The apparatus includes an engine, and an exhaust system operatively connected to the engine and configured to remove exhaust gas from the engine. A TEG is operatively connected to the exhaust system and is configured to allow exhaust gas flow therethrough. A first radiator is operatively connected to the engine. An openable and closable engine valve is configured to open to permit coolant to circulate through the engine and the first radiator when coolant temperature is greater than a predetermined minimum coolant temperature. A first and a second valve are controllable to be placed in a first position to route coolant from the TEG to the engine through coolant passages under a first set of operating conditions to thereby establish a first cooling circuit, and to be placed in a second position to route coolant from the TEG to a second radiator through other coolant passages under a second set of operating conditions to thereby establish a second cooling circuit. The first cooling circuit bypasses the second radiator to utilize available coolant heat to warm the engine while relying on the engine pump to move the coolant and thus not using electric power to run an electric pump. The second cooling circuit bypasses the engine and the first radiator, and thus uses the cooling capacity of the second radiator entirely for cooling the TEG to increase the temperature differential in the TEG and corresponding electric power output of the TEG. By controlling the valves, the first circuit can be used for engine warm-up, and the second circuit can be used to maintain a sufficient temperature differential through the TEG to ensure adequate TEG electrical output under warmed engine and high engine output conditions.

Accordingly, a method of operating a cooling circuit in a vehicle having an engine and a TEG in an exhaust system includes directing coolant from the TEG to the engine and from the engine to the TEG in a first cooling circuit when coolant temperature is below a predetermined temperature and engine load is below a predetermined engine load. An engine valve is opened to further direct some of the coolant from the engine to a first radiator and from the first radiator to the engine when coolant temperature is above the predetermined temperature. Coolant is directed from the TEG to a second radiator and from the second radiator to the TEG in a second cooling circuit when engine load is above the predetermined engine load. The first cooling circuit bypasses the second radiator. The second cooling circuit bypasses the engine and the first radiator.

The above features and advantages and other features and advantages of the present invention are readily apparent from the following detailed description of the best modes for carrying out the invention when taken in connection with the accompanying drawings.

DESCRIPTION OF THE INVENTION

Figure 1:
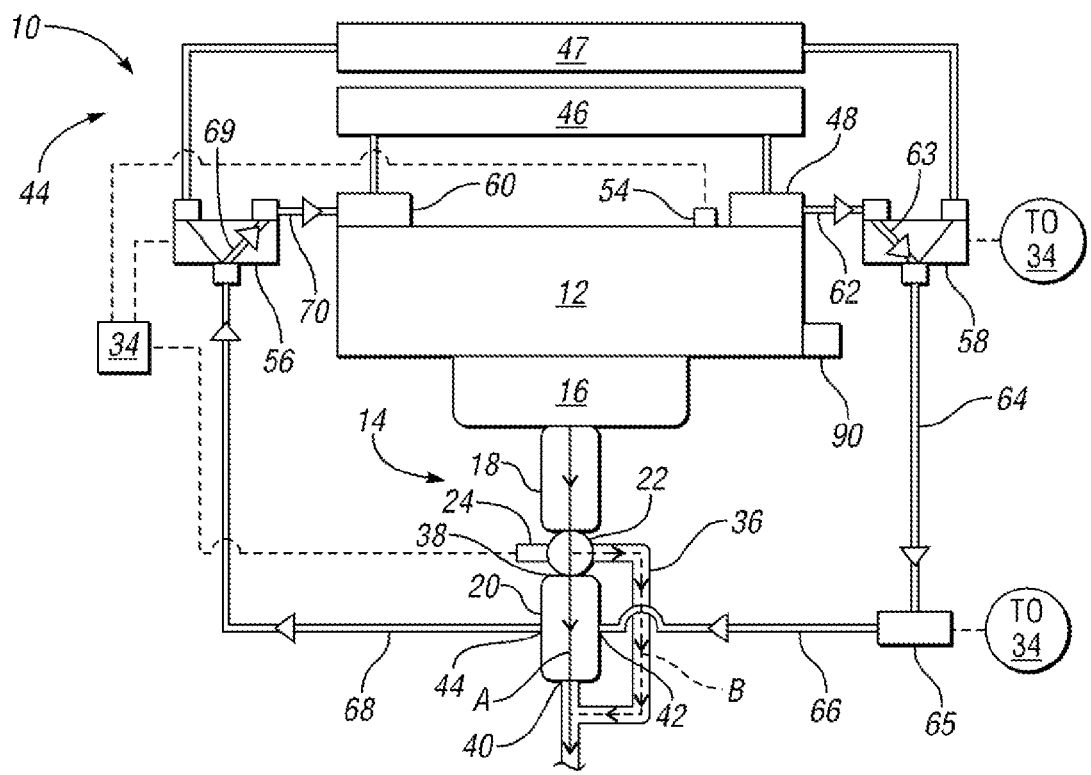
FIG. 1 is a schematic illustration of an apparatus with an engine, a thermoelectric generator, radiators, and variable cooling circuits with valves controlled to direct coolant through a first cooling circuit.

Referring to the drawings, wherein like reference numbers refer to like components, FIG. 1 shows an apparatus 10 for a vehicle that includes an engine 12 with an exhaust system 14. The exhaust system 14 includes an exhaust manifold 16 from which exhaust gas flows into a catalytic converter 18. The exhaust gas then flows through a thermoelectric generator (TEG) 20 (discussed in further detail below), as illustrated with the solid arrow A running through TEG 20, before exiting the apparatus 10. Alternatively, a bypass valve 22 may be moved by an actuator 24 in response to a control signal from a controller 34 to divert some or all of the exhaust gas away from the TEG 20, as represented by the phantom arrows B running through bypass passage 36. The operating conditions under which the bypass valve 22 will be moved are discussed further below.

The TEG 20 is used to produce electrical energy from exhaust heat as explained herein. The TEG 20 has an exhaust gas inlet 38 and an exhaust gas outlet 40 which permit exhaust gas to flow through the TEG 20 generally in the direction of the arrow A. As is understood by those skilled in the art, the exhaust gas flows through the TEG 20 to heat a hot side heat sink within the TEG 20. Coolant also flows through the TEG from coolant inlet port 42 to coolant output port 44 to reduce the temperature of a cold side heat sink within the TEG 20. Within the TEG 20, coolant flow passages may cause coolant to flow in the same direction as the exhaust flow (i.e., in the direction of arrow A) before exiting through the outlet port 44. The TEG has multiple modules that contain a plurality of solid state elements able to generate electrical energy in response to a temperature differential, as is understood by those skilled in the art. Some of the exhaust heat is absorbed by the hot side heat sink. The coolant reduces the temperature of the cold side heat sink. Thus, a temperature differential is created across the TEG modules, so that the TEG 20 generates electrical power that may be stored or used by various vehicle operating systems.

The TEG modules within the TEG 20 must not exceed a maximum recommended operating temperature for extended periods of time. The maximum recommended operating temperature is referred to herein as a critical temperature TC above which the TEG 20 may be damaged by extreme temperature. Thus, the controller 34 diverts exhaust heat by actuating the bypass valve 22 when vehicle operating conditions indicate temperature within the TEG 20 may exceed the critical temperature TC. The position of the bypass valve 22 is determined at least in part on the expected temperature of the TEG 20, which may be measured by a metal temperature sensor within the TEG 22, the temperature of the exhaust gas at the exhaust gas inlet 38 (or just upstream thereof) as measured by a temperature sensor, engine loading as measured by engine speed in revolutions per minute (rpm) over a given period of time, manifold air flow or manifold air pressure, or other operating conditions indicative of or that may be correlated with temperature of the hot side heat sink of the TEG 20.

Cooling of the TEG 20 is integrated in a variable cooling circuit 44 that may also direct coolant through the engine 12, depending on the vehicle operating conditions. Specifically, the engine 12 is in selective fluid communication with a first radiator 46, also referred to herein as an engine radiator 46, and the TEG 20 is in selective fluid communication with the engine 12 or with a second radiator 47, also referred to herein as a TEG radiator.

When coolant temperature is below a predetermined coolant temperature, as indicated by a coolant temperature sensor 54 mounted to the engine 12 or otherwise in operative contact with the coolant, the engine valve 48 is closed. FIG. 1 represents the coolant flow through a first coolant flow circuit (defined below) occurring during a first set of vehicle operating conditions, i.e., when the coolant temperature is below a predetermined temperature and engine load is below a predetermined engine load. The temperature sensor 54 sends a sensor signal to the controller 34. The controller 34 opens the engine valve 48 via a control signal to an actuator (not shown, but as is well understood in the art), if coolant temperature is above the predetermined temperature. Other means of estimating coolant temperature or of opening the engine valve 48 may be used instead. For example, the engine valve 48 may be a type of valve that automatically opens in response to temperature instead of in response to a control signal. Engine load may be determined by the controller 34 based on sensors that measure engine speed in revolutions per minute, throttle position, manifold air flow, manifold air pressure, or other measurable operating characteristics that may be related to engine load by an algorithm and look-up table stored in the controller 34. As used herein, "engine load" is a percentage of maximum power available at a given input speed. Intake manifold air pressure is correlated with engine load and thus may be used as an indicator of engine load. A high intake manifold air pressure is indicative of high engine load, and a low intake manifold air pressure is indicative of low engine load.

When the coolant temperature is below the predetermined temperature, the controller 34 places a first valve 56 and a second valve 58 in respective first positions shown in FIGS. 1 and 2. A first pump 60, also referred to herein as an engine pump, is run by the engine 12 and acts to pump coolant through the engine 12 whenever the engine 12 is running Coolant passage 62 permits coolant flow from the engine 12, through a first branch 63 of second valve 58 when second valve 58 is in the first position, to coolant passage 64. Fluid flows from coolant passage 64 through or past an electronic pump 65 to coolant passage 66. The electronic pump 65 is operatively connected to the controller 34 and is controlled to be on only under certain operating conditions. When the coolant temperature is below the predetermined temperature, the coolant pump 65 is off. Coolant passage 66 permits coolant flow from the pump 65 to the coolant inlet port 42. Coolant flows through the TEG 20 to the coolant outlet port 44. Coolant passage 68 permits coolant flow from the TEG 20 to the first valve 56. Coolant flows through a first branch 69 of the first valve 56. When the first valve 56 is in the first position, coolant passage 70 permits coolant flow from the first valve 56 to the engine pump 60, and coolant then flows back to the engine 12.

Thus, the engine 12, the first and second valves 56, 58, engine pump 60, engine valve 48, electronic pump 65, TEG 20, and coolant passages 62, 64, 66, 68 and 70 establish a first cooling circuit under the first set of operating conditions (i.e., coolant temperature below a predetermined temperature and engine load below a predetermined load). The first cooling circuit bypasses both the first radiator 46 and the second radiator 47. Thus, all heat carried in the coolant from the TEG 20 is used to warm the engine 12 in order to improve engine fuel economy under the first set of operating conditions.

Figure 2:
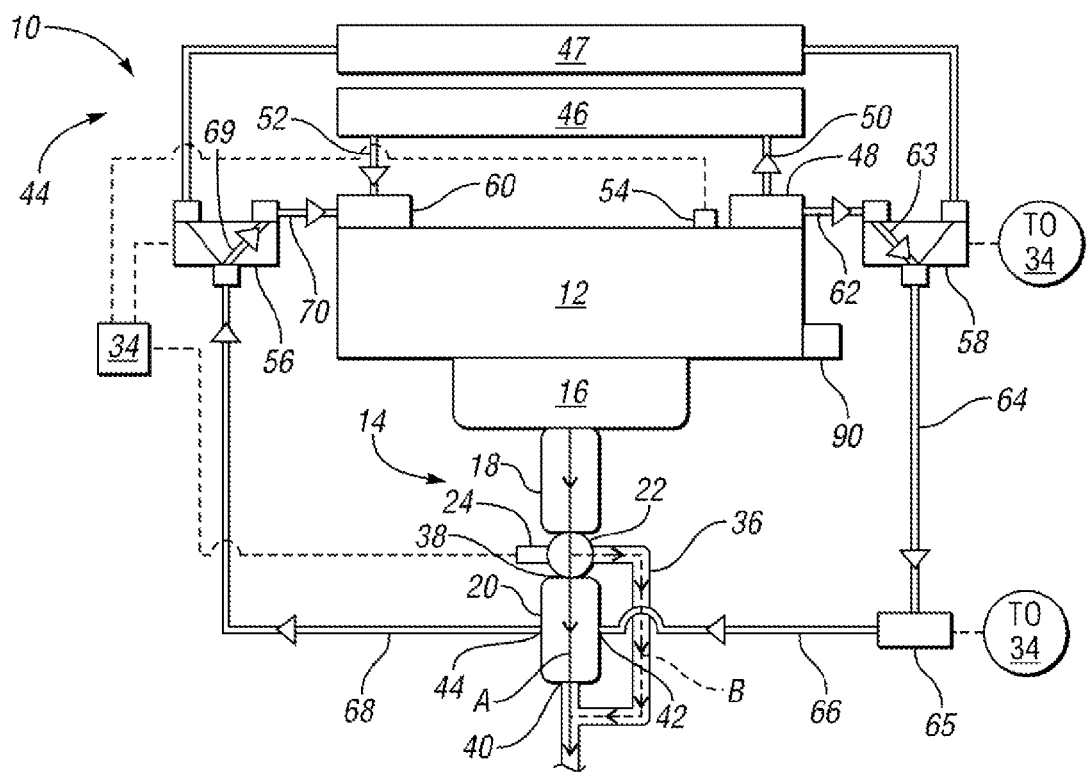
FIG. 2 is a schematic illustration of the apparatus of FIG. 1 with valves controlled to direct coolant through the first cooling circuit and an engine valve opened to permit coolant flow through the engine and a first radiator.

Referring to FIG. 2, when the coolant temperature is greater than the predetermined minimum temperature, the controller 34 sends a signal causing the engine thermostat 48 to open. This causes some of the coolant flowing through the aforementioned first cooling circuit to be diverted through coolant passage 50, first radiator 46, and coolant passage 52 back to engine 12. This additional circuit through the engine 12, passage 50, radiator 46, and passage 52 may be considered part of the first cooling circuit as well. If the engine load is below a predetermined engine load, the controller 34 will not move the valves 56, 58 from the first positions shown in FIGS. 1 and 2. Thus, the coolant heat picked up from the TEG 20 and the engine 12 will be cooled in the first radiator 46, ensuring that the coolant entering the TEG 20 remains at a sufficiently low temperature to maintain adequate electric power output of the TEG 20. The electric pump 65 remains off, so electric power requirements are minimized.

Figure 3:
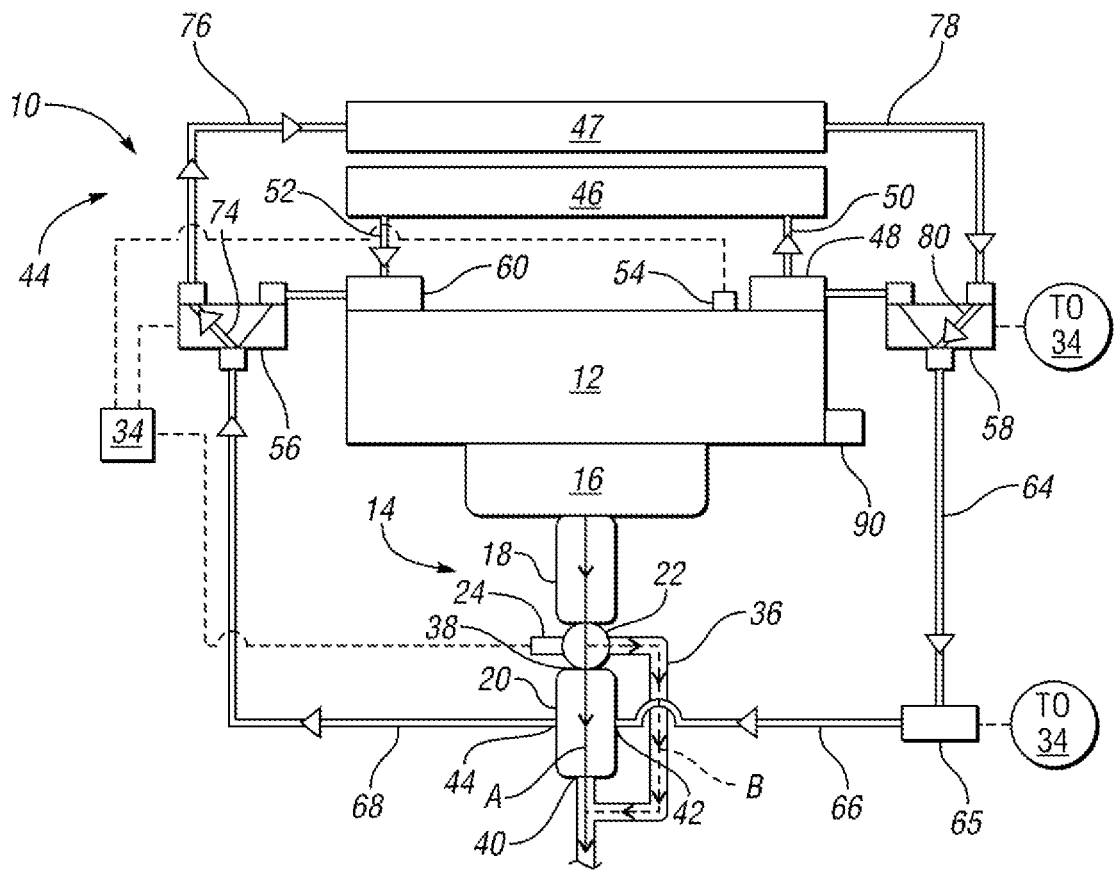
FIG. 3 is a schematic illustration of the apparatus of FIGS. 1 and 2 with the valves controlled to direct coolant through a second cooling circuit.

Referring to FIG. 3, when the engine load reaches a predetermined minimum load, the controller 34 switches the valves 56, 58 to respective second positions shown in FIG. 3. This causes fluid to flow from cooling passage 68 through branch 74 to coolant passage 76. Coolant passage 76 permits fluid flow from the valve 56 to second radiator 47. Coolant passage 78 permits coolant cooled by radiator 47 to flow through second branch 80 of second valve 58 to coolant passage 64. In the second positions of FIG. 3, the valves 56, 58 cause all coolant flowing through the TEG 20 to be diverted from the engine 12 and first radiator 46 to the second radiator 47. Thus, when the valves 56, 58 are in the second positions, the controller 34 turns the electric pump 65 on to keep coolant moving through the second cooling circuit, which includes the TEG 20, coolant passage 68, first valve 56, coolant passage 76, second radiator 47, coolant passage 78, second valve 58, coolant passage 64, electric pump 65, and coolant passage 66. The engine 12 is cooled by the first radiator 46, as the engine pump 60 keeps coolant moving from the engine 12, through open engine valve 48 to coolant passage 50, through first radiator 46, and back through coolant passage 52 and engine pump 60 to engine 12. Thus, under the second set of vehicle operating conditions, in which the engine 12 is warmed (i.e., coolant temperature is above a predetermined minimum temperature) and engine load is above a predetermined minimum load, both radiators 46, 47 are used for cooling, enabling the second radiator 47 to sufficiently lower the temperature of coolant provided to the TEG 20 to thereby maintain a sufficient temperature differential through the TEG 20 to ensure that a sufficient amount of electric power is generated by the TEG 20.

Another advantage of the apparatus 10 is the ability to fill both the first cooling circuit and the second cooling circuit together in a single filling. A fill port 90 is shown in fluid communication with the engine 12. The fill port 90 may be a pressure bottle/reservoir external to the engine 12. Alternatively, the fill port 90 could be located on either radiator 46, 47. The fill port 90 may be positioned relatively high so as to provide an easy drain to the engine 12 via a hose. There may be vent hoses (with an orifice to prevent large flow) from the high point in the water jacket of engine cylinder head(s) (not shown) that run back to the fill port 90 to vent the fill for service. If the valves 56, 58 are in the first position at the start of fill, they are switched to the second positions of FIG. 3 so that the coolant flow passages 76, 78 and second radiator 47 are also filled by coolant addition through the fill port 90. Assuming the valves 56, 58 are electronically actuated solenoid valves, they could be manually switched during the filling procedure by applying a voltage to them (e.g., 12 volts). Alternatively, a bypass hose and manual valve could be added to connect the first and second cooling circuits around one or more of the valves 56, 58 specifically for use during the filling procedure.

Figure 4:
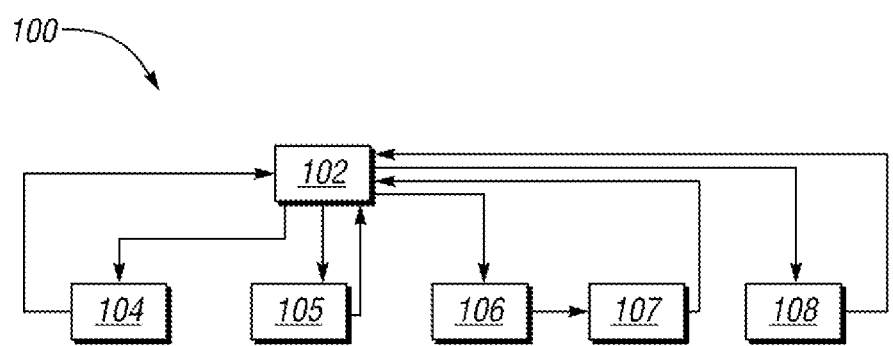
FIG. 4 is a schematic flowchart illustrating a method of controlling a cooling circuit in a vehicle having an engine and a thermoelectric generator in an exhaust system.

Referring to FIG. 4, a method 100 of controlling a cooling circuit in a vehicle is shown as a schematic flowchart. The method 100 is described with respect to the apparatus 10 of FIGS. 1-3, but is not limited to the embodiment of the apparatus 10 shown. The method 100 is stored as an algorithm in a processor of the controller 34 and is carried out by the controller 34. The method 100 begins with block 102, in which operating conditions of the apparatus 10 are sensed. As discussed above, this may include sensing coolant temperature using the coolant temperature sensor 54, sensing engine load using an engine speed sensor, a manifold air pressure or air flow sensor, or other means, and sensing an indicator of the temperature within the TEG 20, such as by a metal temperature sensor within the TEG 20, temperature of the exhaust gas at the exhaust gas inlet 38, or just upstream thereof, engine loading as measured by engine rpm over a given period of time, or other operating conditions indicative of temperature of a hot side heat sink of the TEG 20.

Based on the sensed operating conditions of block 102, the method 100 proceeds to block 104, block 105, block 106, or block 108. If the sensed operating conditions in block 102 indicate that coolant temperature is below a predetermined temperature and engine load is below a predetermined load, the method 100 moves to block 104 and directs coolant from the TEG 20 to the engine 12 and from the engine 12 to the TEG 20 in the first cooling circuit defined above by positioning the first and second valves 56, 58 in the first position as shown in FIG. 1, bypassing both the first radiator 46 and the second radiator 47.

If the valves 56, 58 are already in the first position of FIG. 1, and sensed operating conditions in block 102 indicate that coolant temperature is above the predetermined temperature but engine load is still below the predetermined load, then the method 100 moves to block 105 to open the engine valve 48 and allow coolant flow from the engine 12 to the first radiator 46 and back to the engine 12, still bypassing the second radiator 47. Alternatively, the engine valve 48 may be automatically activated by temperature, not in response to a control signal sent by the controller 34.

If the sensed operating conditions in block 102 indicate that the coolant temperature is above the predetermined temperature and engine load is above the predetermined engine load, then the method 100 moves to block 106 to position the valves 56, 58 in the second positions of FIG. 3, thereby directing coolant in the second cooling circuit described above from the TEG 20 to the second radiator 47 and from the second radiator 47 to the TEG 20, bypassing the engine 12 and the first radiator 46. The method 100 must also move to block 107 after block 106 to turn on the pump 65 in order to cause coolant to flow through the second cooling circuit.

In addition to adjusting the flow of the coolant in blocks 104, 105, 106 and 107, the method 100 also monitors the temperature of the TEG 20 in block 102 by sensing operating conditions such as by a metal temperature sensor within the TEG 20, the temperature of the exhaust gas at the exhaust gas inlet 38, or just upstream thereof, as measured by a temperature sensor, engine loading as measured by engine rpm over a given period of time, or other operating conditions indicative of temperature of the hot side heat sink of the TEG 20. If the sensed conditions indicate the temperature within the TEG 20 is above another predetermined temperature, the method 100 will adjust the bypass valve 22 in block 108 to direct at least a portion of the exhaust gas flow around the TEG 20.

Thus, the apparatus 10 and method 100 are designed to allow rapid warm-up of the engine 12 to improve engine efficiency and minimize electric power requirements by directing heated coolant exiting the TEG 20 to the engine 12, and then directing the heated engine coolant to the second radiator 47 when the engine 12 is sufficiently warmed and engine load is high enough to merit operating the electrical pump 65. Utilizing the second radiator 47 enables a greater reduction in coolant temperature entering the TEG 20, thus optimizing electrical energy production of the TEG 20.

While the best modes for carrying out the invention have been described in detail, those familiar with the art to which this invention relates will recognize various alternative designs and embodiments for practicing the invention within the scope of the appended claims.

The invention claimed is:
1. An apparatus comprising:
an engine;
an exhaust system operatively connected to the engine and configured to remove exhaust gas from the engine;
a thermoelectric generator (TEG) operatively connected to the exhaust system and configured to allow exhaust gas flow therethrough;
a first radiator operatively connected to the engine;
an openable and closable engine valve configured to open to permit coolant to circulate through the engine and the first radiator when coolant temperature is greater than a predetermined minimum coolant temperature;
a second radiator;
a plurality of coolant passages; and
a first and a second valve controllable to route cooling fluid from the TEG to the engine through some of the coolant passages under a first set of operating conditions to establish a first cooling circuit, and from the TEG to the second radiator through other of the coolant passages under a second set of operating conditions to establish a second cooling circuit; wherein the first cooling circuit bypasses the second radiator and the second cooling circuit bypasses the engine and the first radiator.

2. The apparatus of claim 1, further comprising a first pump driven by the engine and operable to pump coolant through the engine when the engine is running; and a second pump controllable to be off when the first cooling circuit is established and to be on to pump coolant through the TEG when the second cooling circuit is established.

3. The apparatus of claim 1, wherein the exhaust system includes a bypass valve selectively movable to direct at least a portion of the exhaust gas away from the TEG under predetermined operating conditions.

4. The apparatus of claim 1, wherein the apparatus includes a filling port, and wherein the plurality of coolant passages is configured so that the first radiator, the second radiator, and the engine may be filled with coolant at the filling port.

5. An apparatus comprising:
an engine;
an exhaust system operatively connected to the engine and configured to remove exhaust gas from the engine;
a thermoelectric generator (TEG) operatively connected to the exhaust system and configured to allow exhaust gas flow therethrough;
a first radiator operatively connected to the engine;
an openable and closable engine valve configured to open to permit coolant to circulate through the engine and the first radiator when coolant temperature is greater than a predetermined minimum coolant temperature;
a second radiator;
a plurality of coolant passages;
a first valve and a second valve; wherein the first valve and the second valve are controllable to selectively establish respective first positions to route coolant flow through some of the coolant passages so that coolant flows from the TEG to the engine and from the engine to the TEG bypassing the second radiator when the engine is operating under a load less than a predetermined minimum load, and controllable to selectively establish respective second positions to route coolant flow through other of the coolant passages so that at least some of the coolant flows from the TEG to the second radiator and from the second radiator to the TEG thereby bypassing the engine and the first radiator when the engine valve is open and the engine is operating under a load not less than the predetermined minimum load.

6. The apparatus of claim 5, further comprising a first pump driven by the engine and operable to pump coolant through the engine when the engine is running; and a second pump controllable to be off when the first valve and the second valve are in the first positions and to be on to pump coolant through the TEG when the first valve and the second valve are in the second positions.

7. The apparatus of claim 5, wherein the exhaust system includes a bypass valve selectively movable to direct at least a portion of the exhaust gas away from the TEG under predetermined operating conditions.

8. The apparatus of claim 5, wherein the apparatus includes a filling port, and wherein the plurality of coolant passages is configured so that the first radiator, the second radiator, and the engine may be filled with coolant at the filling port.

9. A method of controlling a cooling circuit in a vehicle having an engine and a thermoelectric generator in an exhaust system, comprising:
directing coolant from the TEG to the engine and from the engine to the TEG in a first cooling circuit when coolant temperature is below a predetermined temperature and engine load is below a predetermined engine load;
opening an engine valve to further direct some of the coolant from the engine to a first radiator and from the first radiator to the engine when coolant temperature is above the predetermined temperature;
directing coolant from the TEG to a second radiator and from the second radiator to the TEG in a second cooling circuit when engine load is above the predetermined engine load; and wherein the first cooling circuit bypasses the second radiator and the second cooling circuit bypasses the engine and the first radiator.

10. The method of claim 9, further comprising:
operating a pump to pump coolant through the second cooling circuit only when coolant is directed from the TEG to the second radiator.

11. The method of claim 9, further comprising:
directing at least a portion of the exhaust gas away from the TEG under predetermined operating conditions.

* * * * *